United States Patent
Prakah-Asante et al.

(10) Patent No.: US 7,712,776 B2
(45) Date of Patent: May 11, 2010

(54) METHOD AND CONTROL SYSTEM FOR PREDICTIVE DEPLOYMENT OF SIDE-IMPACT RESTRAINTS

(75) Inventors: Kawku O. Prakah-Asante, Commerce Township, MI (US); Manoharprasad K. Rao, Novi, MI (US); Gary S. Strumolo, Beverly Hills, MI (US)

(73) Assignee: Ford Global Technologies, Dearborn, MI (US)

( * ) Notice: Subject to any disclaimer, the term of this patent is extended or adjusted under 35 U.S.C. 154(b) by 1514 days.

(21) Appl. No.: 10/794,881

(22) Filed: Mar. 5, 2004

(65) Prior Publication Data
US 2005/0206142 A1 Sep. 22, 2005

(51) Int. Cl.
*B60R 21/16* (2006.01)
(52) U.S. Cl. .................................................. 280/735
(58) Field of Classification Search ................ 280/735; 340/435, 436, 903; 701/45
See application file for complete search history.

(56) References Cited

U.S. PATENT DOCUMENTS

| | | | | |
|---|---|---|---|---|
| 5,785,347 A * | 7/1998 | Adolph et al. | .............. | 280/735 |
| 6,758,495 B2 * | 7/2004 | Brambilla et al. | ........... | 280/806 |
| 6,898,498 B1 * | 5/2005 | Wessels et al. | ................ | 701/45 |
| 7,130,730 B2 * | 10/2006 | Strumolo et al. | .............. | 701/45 |
| 7,243,013 B2 * | 7/2007 | Rao et al. | ...................... | 701/45 |
| 2004/0000992 A1 * | 1/2004 | Cuddihy et al. | ............. | 340/436 |

* cited by examiner

*Primary Examiner*—Faye M. Fleming
(74) *Attorney, Agent, or Firm*—Angela M. Brunettil; Frank MacKenzie

(57) ABSTRACT

A side-impact control system (10) for a vehicle (12) includes an adaptive restraint (15). A side sensor (30) is configured to detect an object, in a restraint dependent detection zone (60) along a side (13) of the vehicle (12), and generates an object detection signal. A controller (16) determines an activation time for and a deployment status of the adaptive restraint (15), and activates the adaptive restraint (15) before or after contact between the object and the side (13).

20 Claims, 4 Drawing Sheets

METHOD AND CONTROL SYSTEM FOR PREDICTIVE DEPLOYMENT OF SIDE-IMPACT RESTRAINTS

TECHNICAL FIELD

The present invention relates to vehicle safety restraints and deployment systems. More particularly, the present invention relates to a method and system for deployment control of side-impact adaptive restraints within a vehicle.

BACKGROUND OF THE INVENTION

To improve the safety aspects of vehicles, many manufacturers are now including side and curtain airbags. Side and curtain airbags may be employed in a vehicle side door, an A-pillar, a B-pillar, and other side structures and components of a vehicle. Side airbags are presently deployed in response to the information collected from side or lateral accelerometers and crush or pressure sensors. The accelerometers are used to determine or estimate severity of a collision and the pressure sensors are used to determine the condition of a vehicle or an estimated amount of intrusion into a vehicle of an object, after contact therewith. Upon receipt of the stated information, algorithms are used to evaluated conditions of a collision for restraint deployment.

For a 30 mph vehicle-to-vehicle collision, current deployment systems require a short activation time for restraint deployment, which is the time difference between when a host vehicle contacts an object and when a restraint is deployed. It is common for this period to be approximately 3-5 ms. From the onset of a collision, side airbags typically fully inflate in approximately 10-15 ms after activation. The stringent activation time requirements are due to the limited side structure of a vehicle and the limited available space between the interior side of the vehicle and an occupant, such as for example between an inside door panel and a vehicle occupant.

It is desirable to deploy airbags at different rates depending upon the severity of a collision. It is also desirable to deploy an airbag such that it is fully deployed at the appropriate time to maximize collision energy absorption and prevent injury to a vehicle occupant. It is understood that injury mitigation is not maximized when airbag deployment inaccurately occurs at an inappropriate time.

Also, current side airbag deployment systems, in certain scenarios, may be limited in their ability to differentiate between severe collisions and marginal collisions. For example, an accelerometer, installed in one selected area of a vehicle, may not detect or fully detect the energy experienced in a localized collision event in another or nearby area of the vehicle. Subsequently, non-deployment, or late deployment of side-restraints can occur.

Additionally, some airbag deployment systems, that include front airbags, can accidentally deploy the front airbags during a side collision. The National Automotive Sampling System indicates that 16% of frontal airbags have deployed for 3 o'clock side-collisions, while 22% of frontal airbags have deployed for 9 o'clock side-collisions.

Furthermore, current side airbag deployment systems do not account for occupant characteristics, such as occupant size, weight, and position within a seat system. As an example, it can be undesirable for a side airbag to deploy when an occupant is resting against a door panel or when a small occupant, such as a young child, is located in the seat system of concern.

Thus, there exists a need for an improved airbag deployment system for a vehicle that provides improved side airbag deployment control with accurate and appropriate deployment timing. The system should account for localized collisions, varying degrees of collision severity, and occupant characteristics, and prevent inadvertent deployment of front airbags during a side collision event.

SUMMARY OF THE INVENTION

The present invention provides systems and methods of controlling the deployment of side restraints within a vehicle. A control system for a vehicle is provided and includes an adaptive restraint. A side sensor is configured to detect an object, in a detection zone along a side of the vehicle, and generate an object detection signal. A controller determines a decision-making zone for the adaptive restraint, an activation time for and a deployment status of the adaptive restraint, and activates the adaptive restraint before or after contact between the object and the vehicle side structure.

The embodiments of the present invention provide several advantages. One such advantage, provided by several embodiments of the present invention, is the provision of a side restraint deployment control system that accurately and appropriately deploys side collision related restraints. In so providing, the stated embodiments are capable of determining restraint deployment times and are capable of activating restraints before or after contact between an impending collision object and a host vehicle. The stated embodiments also account for localized collisions and minimize inadvertent deployment. In addition, the stated embodiments account for collision severity.

Another advantage provided by an embodiment of the present invention is the provision of a side restraint deployment control system that accounts for various occupant characteristics when determining deployment times and whether to activate a restraint. As such, the stated embodiment minimizes injury to vehicle occupants.

Yet another advantage provided by an embodiment of the present invention is the provision of a side restraint deployment control system that performs a side collision confirmation and signals frontal restraint systems of side collision status, which aids in the prevention of unwarranted deployment of side and frontal restraints.

The present invention itself, together with attendant advantages, will be best understood by reference to the following detailed description, taken in conjunction with the accompanying figures.

BRIEF DESCRIPTION OF THE DRAWINGS

For a more complete understanding of this invention reference should now be made to embodiments illustrated in greater detail in the accompanying figures and described below by way of examples of the invention wherein.

DETAILED DESCRIPTION

Figure 1:
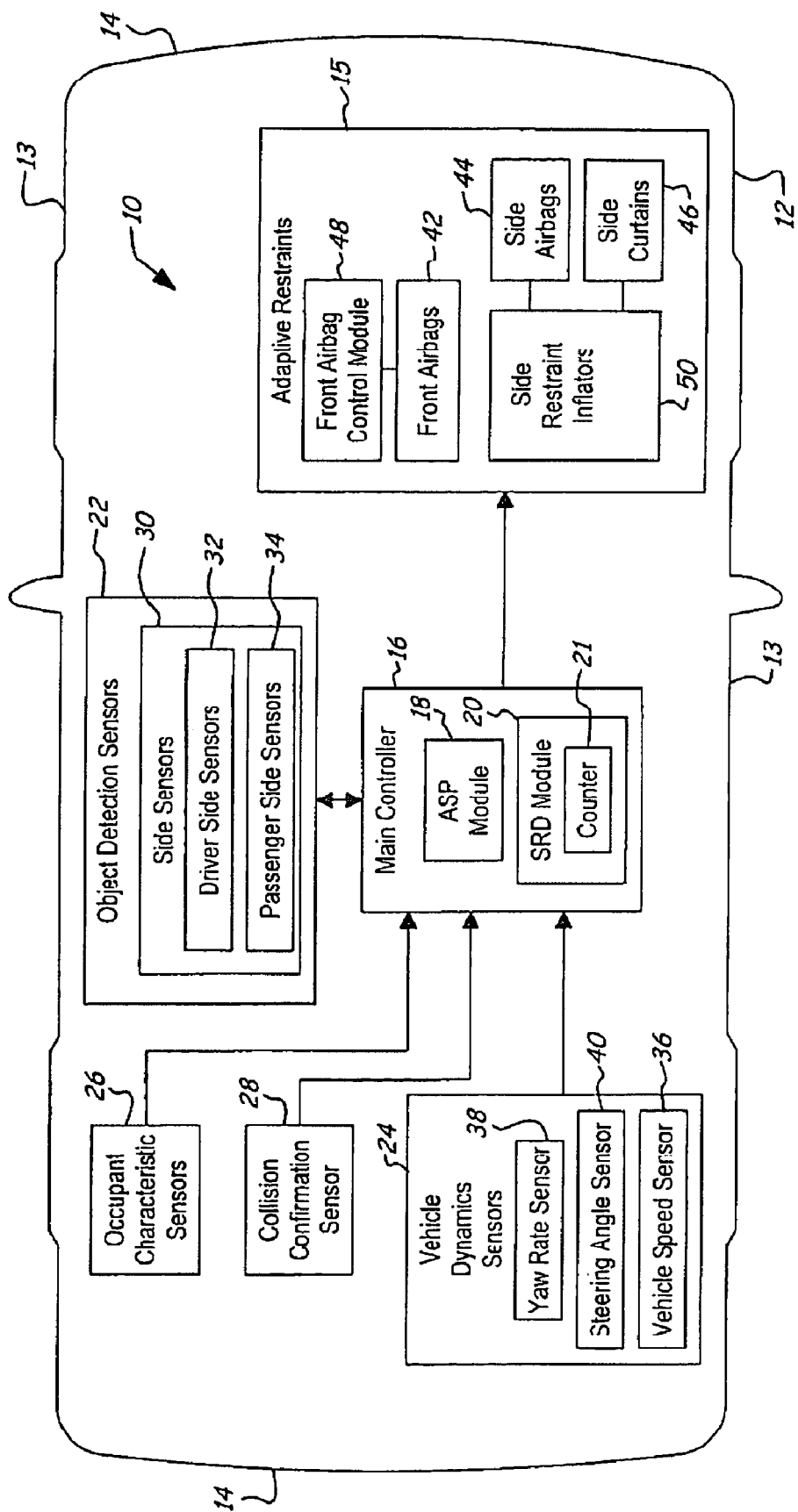
FIG. 1 is a block diagrammatic view of an integrated control system architecture for a vehicle in accordance with an embodiment of the present invention.

In the following figures the same reference numerals will be used to refer to the same components. Also, in the following description, various operating parameters and components are described for multiple constructed embodiments. These specific parameters and components are included as examples and are not meant to be limiting.

Additionally, in the following description, the term "performing" may include activating, deploying, initiating, powering, and other terms known in the art that may describe the manner in which a safety restraint system or a comfort and convenience feature may be operated.

As well, in the following description, various safety restraints are discussed. The restraints may be reversible or irreversible. Reversible restraints refer to restraints that may be reset to their original form or used repeatedly without a significant amount of functional deficiency, which may be determined by a system designer. Irreversible restraints refer to restraints such as airbags that, once deployed, are not reusable.

Furthermore, a control signal may include information pertaining to the above-stated reversible and irreversible restraints or may include other information, such as collision warning information. For example, the control signal may contain object detection information, which may be used to indicate to a vehicle operator the presence or close proximity of a detected object.

In addition, the term "object" may refer to any animate or inanimate object. An object may be a vehicle, a pedestrian, a road sign, a vehicle occupant, or other object known in the art.

Also, although the present invention is primarily described with respect to side restraint deployment, the present invention may be applied to various other safety system deployments known in the art.

Referring now to FIG. 1, a block diagrammatic view of an integrated control system architecture 10 for a host vehicle 12 in accordance with an embodiment of the present invention is shown. The vehicle 12 has sides 13 that extend longitudinally between the front and rear 14 of the vehicle 12. The system architecture 10 includes a main controller 16 that determines activation times and the deployment status for selected adaptive restraints 15 and in response to various parameters described below performs activation thereof.

The system architecture 10 includes the main controller 16 that has an object and host vehicle accident state prediction (ASP) module 18 and a side restraint deployment (SRD) module 20. The ASP module 18 receives object related information from object detection sensors 22, host vehicle dynamic related information from dynamic sensors 24, and in response thereto determines various side collision related parameters. The side collision related parameters may include range, range rate, position, and heading of an object relative to the vehicle 12. The side collision related parameters may also include the amount of time that an object is within a detection zone, lateral velocity of the vehicle 12, as well as other related parameters known in the art. The ASP module 18 in response to the side collision parameters selects or determines a decision zone, which is utilized in performing various restraint deployment related tasks, and estimates time-to-collision and desired activation time of one or more of the restraints 15.

The SRD module 20 receives the host vehicle and obstacle trajectories, the time-to-collision, and the activation time of the restraints 15 from the ASP module 18, occupant characteristics from occupant characteristic sensors 26, collision confirmation information from collision confirmation or contact sensors 28, and in response thereto controls activation of the restraints 15. The SRD module 20 obtains information corresponding to the vehicle 12, detected objects of concern, and occupants within the vehicle 12 to tailor activation and deployment of the restraints 15. The SRD module 20 also determines the appropriate stage of deployment for situations when multi-stage deployable restraints are utilized. The SRD module 20 includes an internal counter 21. The counter 21 is used to assure that deployments of the restraints 15 occur at the appropriate times.

The above-stated features of the ASP module 18 and the SRD module 20, as well as further features and performance tasks are described in greater detail below.

The main controller 16 may perform as a signal processor and may include analog-to-digital converters, filters, or amplifiers, as well as other signal conditioning components known in the art. The information collected from the various sensors of the present invention may be signal processed at the sensors, by the controller 16, by a separate processor, or by a combination thereof. The controller 16 may be microprocessor based, such as a computer having a central processing unit, have memory (RAM and/or ROM), and associated input and output buses. The controller 16 may be an application-specific integrated circuit or be formed of other logic devices known in the art. The controller 16 may be a portion of a central vehicle main control unit, an interactive vehicle dynamics module, a restraints control module, a main safety controller, or may be a stand-alone controller as shown.

The object detection sensors 22 include side remote sensors 30, such as driver side remote sensors 32 and passenger side remote sensors 34. The side sensors 30 are used to detect objects within detection zones along side of the vehicle 12 and to collect object related information associated therewith and generate object detection signals. The term "side" does not refer to the front and rear of the vehicle 12. Sample detection zones are best seen and described below with respect to the embodiment of FIG. 3. The side sensors 30 may be located in various locations along the sides of the vehicle 12. The side sensors 30 may be located in a vehicle door, in a vehicle pillar, such as an A-pillar or B-pillar, in a side rail or frame, or in various other vehicle structures. The side sensors 30 may be of various styles and types, for example the side sensors 30 may be in the form of radar sensors, lidar sensors, vision sensors, ultrasonic sensors, infrared sensors, or in some other form known in the art. In one embodiment of the present invention, the side sensors 30 are located within the B-pillars of the vehicle 12 and are in the form of radar sensors.

The vehicle dynamic sensors 24 are used to determine dynamics, such as velocity, acceleration, and yaw rate of the vehicle 12 and to generate vehicle dynamic signals. The vehicle dynamic sensors 24 may include a vehicle speed sensor 36, a yaw rate sensor 38, and a steering angle sensor 40. The vehicle speed sensor 36 may be in the form of a transmission rotation sensor, a wheel speed sensor, or other vehicle speed sensor known in the art. The vehicle dynamic sensors 24 may include accelerometers, optical sensors, or other velocity or acceleration sensors known in the art.

The occupant sensors 26 are used to determine various occupant characteristics, such as occupant positioning within a seat system, occupant size, shape, and weight, and to generate occupant signals indicative thereof. The occupant sensors 26 may also be of various styles. The occupant sensors 26 may be in the form of radar sensors, lidar sensors, vision sensors, ultrasonic sensors, infrared sensors, pressure sensors, weight sensors, strain gauges, piezoelectric or piezoresistive sensors, or may be in some other form known in the art. The occupant sensors 26 may also include remote and local accelerometers, seat belt sensors, occupant position sensors, and seat track sensors.

The contact sensors 28 are utilized to verify that a side collision has occurred and to generate collision confirmation signals. The contact sensors 28, like the side sensors 30, may also be in various locations along the side of the vehicle 12 and may even be more internally located within the vehicle 12. The contact sensors 28 may be in the form of accelerometers, pressure-sensors, piezoelectric or piezoresistive sensors, or may be in some other form known in the art.

The restraints 15 are generally in the form of passive safety systems electronically augmented, and include front airbags 42, side airbags 44, and side curtains 46. The front airbags 42 are controlled via a front airbag control module 48. The side restraints 44 and 46 are deployed via inflators 50. The side airbags 44 may be in the form of seat integrated or door mounted airbags. The side curtains 46 may be in the form of pillar or roof supported head restraints. The restraints 15 may also include other airbags or deployable restraints, as well as seatbelt control, knee bolster control, head restraint control, pretensioner control, airbag control, and other side impact passive safety system control known in the art.

Figure 2:
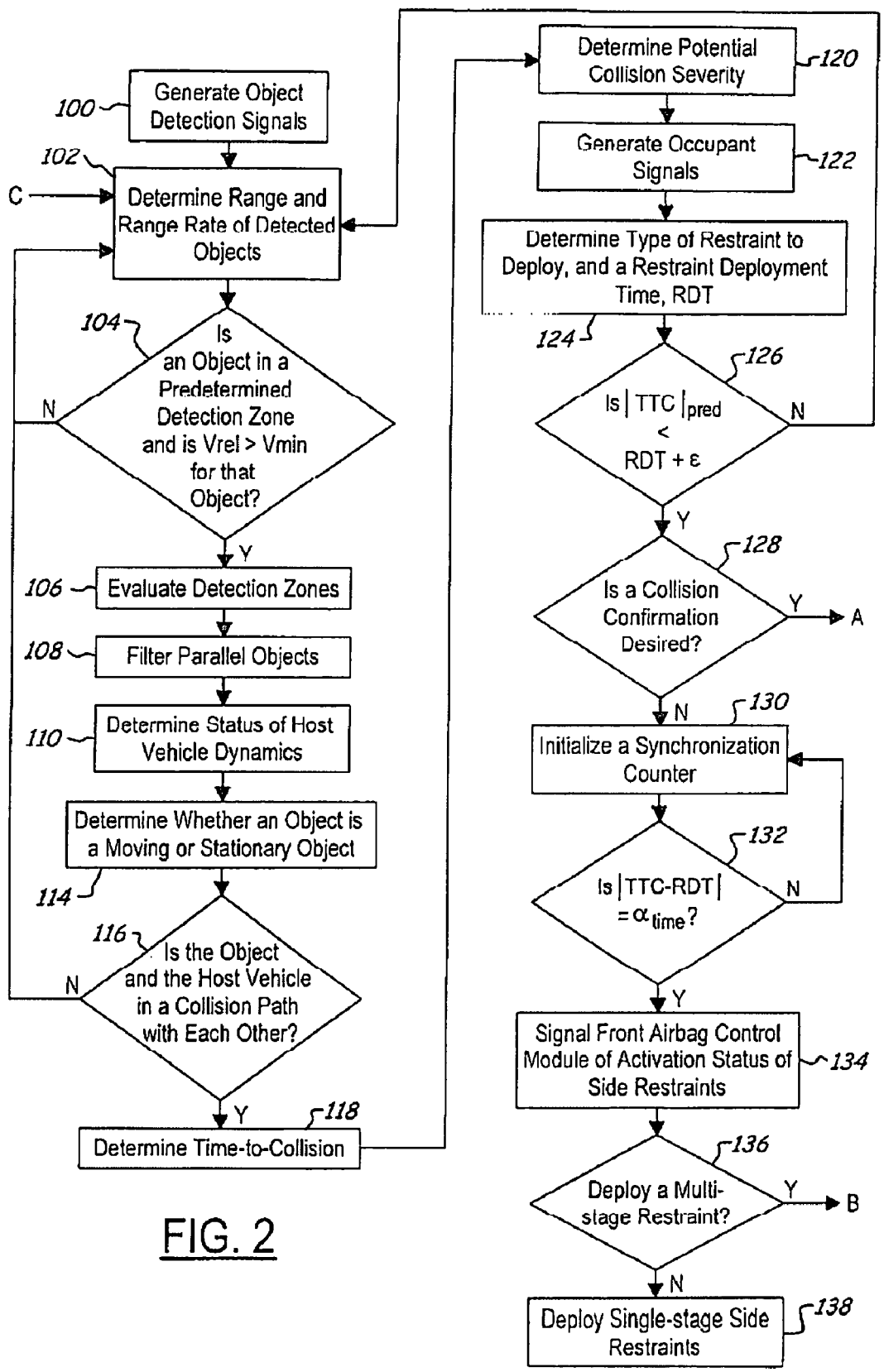
FIG. 2 is a logic flow diagram illustrating a method of controlling activation of adaptive restraints within a vehicle in accordance with an embodiment of the present invention.
Figure 2A:
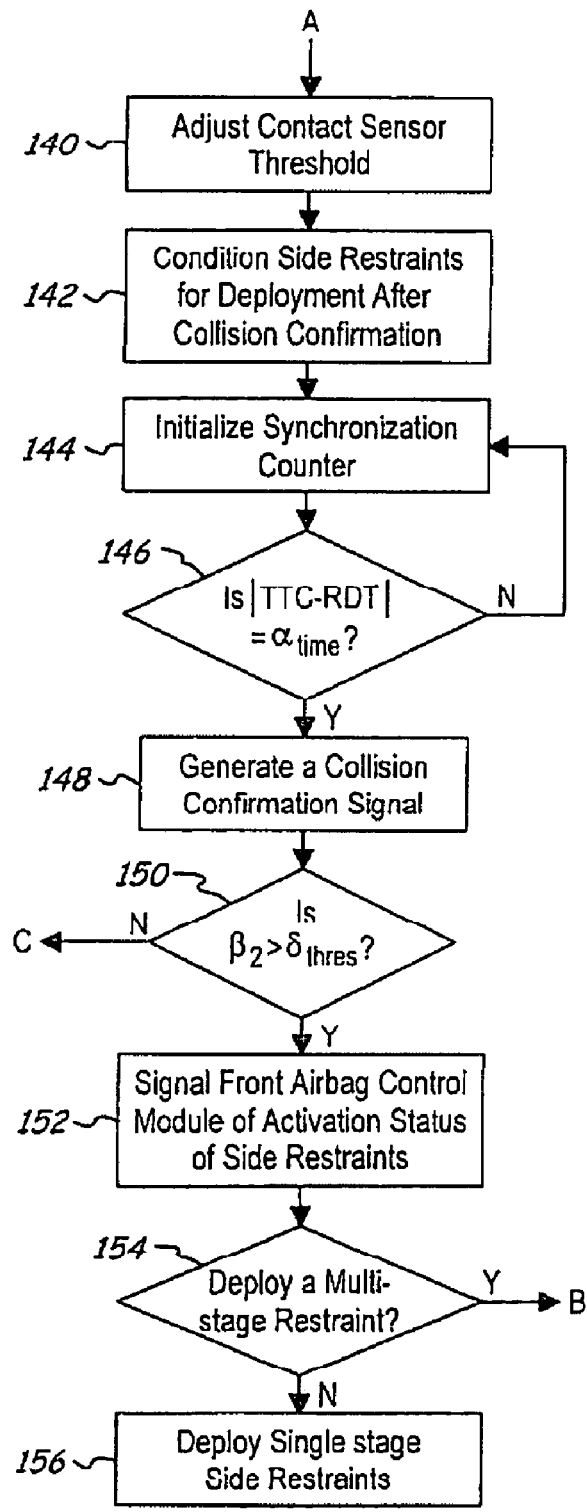
Figure 2B:
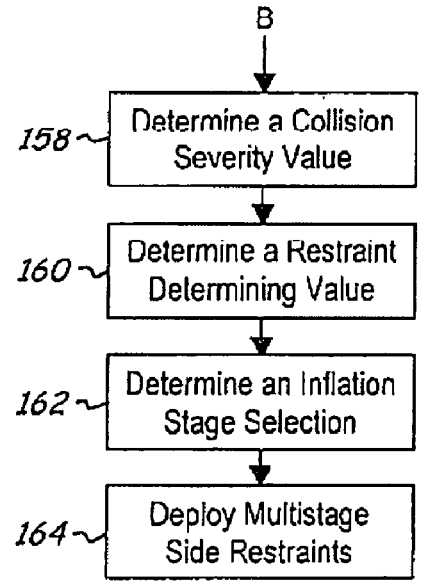

Referring now also to FIG. 2, a logic flow diagram illustrating a method of controlling the activation of the restraints 15 in accordance with an embodiment of the present invention is shown.

In step 100, the object detection sensors 22 generate object detection signals. The object detection sensors 22 monitor detection zones, such as the detection zones 60 shown in FIG. 3. Although only a pair of detection zones 60 is shown for a pair of side sensors 62, any number of detection zones may be utilized with any number of side sensors. The detection zones 60 may include various areas along each side 13.

Figure 3:
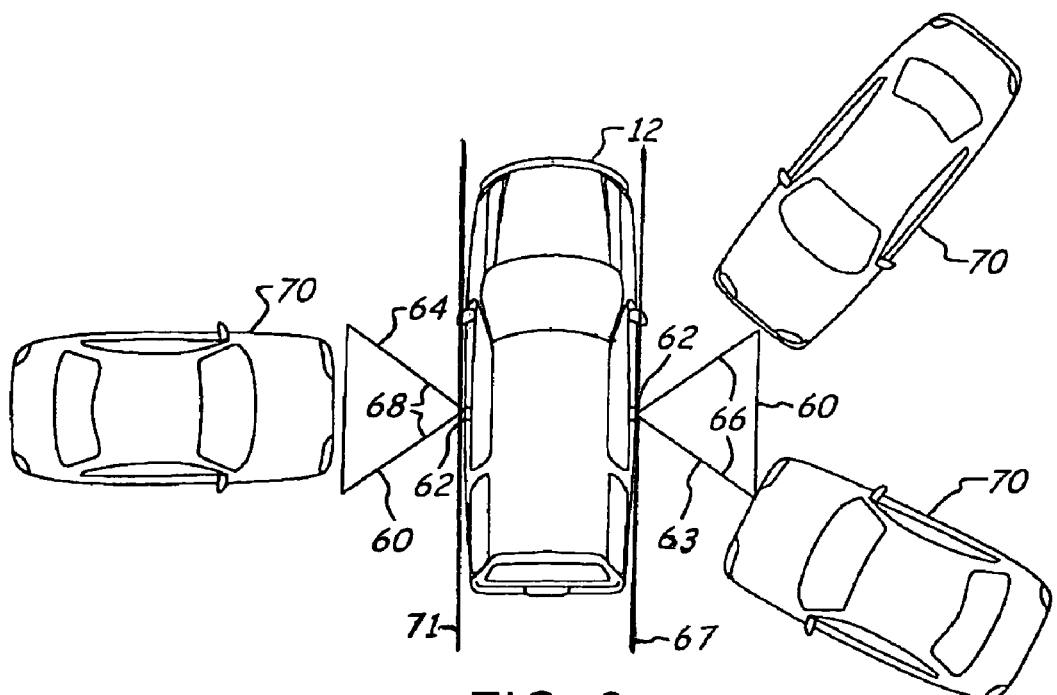
FIG. 3 is a top view of the vehicle of FIG. 1 illustrating the side collision sensor fields-of-view and corresponding detection zones in accordance with an embodiment of the present invention.

In the embodiment of FIG. 3, the detection zones 60 include a first detection zone 63 and a second detection zone 64. The first zone 63 includes an area between 2 o'clock and 4 o'clock, 2 o'clock and 4 o'clock refer to positions at approximately 60° and 120° from a longitudinal line 67 extending along the right side 69 and as represented by lines 66, and up to approximately two meters from the vehicle 12. The second zone 64 includes an area between 8 o'clock and 10 o'clock, 8 o'clock and 10 o'clock refer to positions at approximately 240° and 300° from the longitudinal line 71 extending along a left side 73 and as represented by lines 68, and up to approximately two meters from the vehicle 12. The side sensors 62 are in the form of radar sensors that have a field-of-view of approximately 55°. The detection zones 60 are sized, in general, to cover or monitor one detected vehicle at a time, even though three detected vehicles 70 are shown.

The decision-making zones based on the detection zones 60 may be determined in response to adaptive restraint time constants and trajectories of detected objects, as well as in response to other vehicle and object related parameters known in the art, some of which mentioned herein.

In step 102, the ASP module 18 determines range and range-rate or velocity of the detected objects of concern relative to the vehicle 12. The range-rate information may be obtained via the range information or may be determined directly, depending upon the type of object detection sensors utilized.

In step 104, the ASP module determines whether the objects are within the detection zones 60 and whether their impending relative velocity is greater than or equal to a minimum velocity threshold $V_{min}$. The ASP module 18 may track electromagnetic reflections of the detected objects using radar sensors and may ignore or filter tracked objects that are not in a collision path with the vehicle 12. In so doing, the ASP module 18 may utilize equations 1-3, where $R_m(k)$ is the relative range of an object for a given time k, $R_{max}$ is the decision-making zone range threshold, which as stated may be set equal to approximately two meters, and $V_{rel}$ is the relative velocity or closing velocity of the object.

$$|R_m(k)| \leq R_{max} \quad (1)$$

$$|R_m(k+1)| - |R_m(k)| < R_{max} \quad (2)$$

$$V_{rel} \geq V_{min} \quad (3)$$

The minimum velocity threshold $V_{min}$ is used to prevent restraint deployment in situations where restraint deployment is not desired or warranted. For example, it is undesirable to deploy a restraint in a situation when a detected object is traveling at a slow relative velocity such that deployment of a restraint does not assist in the prevention of an occupant injury, but rather increases vehicle repair costs, due replacement of the deployed restraints and other associated repairs.

In step 106, the detection zones 60 are evaluated. Detected objects within the detection zones 60 are tracked for a minimum time period, represented by $O_{t\_num}$ in equation 4, where $T_{sens}$ is the sampling time of the object detection sensors 22 used in the detection of the objects. As an example, a radar sensor sampling frequency can range from approximately 50-100 Hz. The minimum time period $O_{t\_num}$ corresponds to a number of sample returns wherein a particular object of interest has been detected; each return has an associated time interval. Thus, the minimum time period $O_{t\_num}$ is equal to the number of detected object samples multiplied by a sampling rate.

$$O_{t\_num} \geq \frac{R_{max}}{V_{rel} T_{sens}} \quad (4)$$

In step 108, the ASP module 18 block filters objects, which are parallel to the vehicle 12. The ASP module 18 compares the relative velocity $V_{rel}$ with the minimum velocity threshold $V_{min}$, where the relative velocity $V_{rel}$ is determined using equation 5, T is time, and $$\frac{1}{\tau}$$

is the bandwidth of the filter.

$$V_{rel} = \frac{\Delta R_{meas}}{\Delta t}\left[1 - e^{-\frac{T}{\tau}}\right] \geq V_{min} \quad (5)$$

When the relative velocity $V_{rel}$ is greater than or equal to the minimum velocity threshold $V_{min}$ the ASP module 18 proceeds to step 110, otherwise the ASP module 18 discards or ceases to monitor the object and returns to step 102.

In step 110, position and dynamics of the vehicle 12 are determined. The vehicle dynamic sensors 24 are used to generate the vehicle longitudinal speed $U_h$, a yaw rate signal $\psi$, and a steering dynamics or heading angle signal $\delta$. The ASP module 18 determines the position of the vehicle $(x_h, y_h)$ and lateral velocity of the vehicle $v_{h\_lat}$ in response to the vehicle longitudinal speed $U_h$, the yaw rate $\psi$, and the heading angle $\delta$ by combining vehicle dynamics equations with vehicle position equations in a state-space representation as know in the art, using equations 6-13.

$$\dot{r}=v_r \quad (6)$$

$$\dot{v}_r=a_r \quad (7)$$

$$\dot{x}_h=U_h \cos\delta - v_{h\_lat}\sin\delta \quad (8)$$

$$\dot{y}_h=U_h \sin\delta + v_{h\_lat}\cos\delta \quad (9)$$

$$\dot{\underline{x}}=M\underline{x}+I\underline{u}+F\underline{w} \quad (10)$$

$$\underline{y}=C\underline{x}+\underline{v} \quad (11)$$

$$\underline{x}=[r\ v_r\ \psi\ \delta\ v_{h\_lat}\ x_h\ y_h]^T \quad (12)$$

$$\dot{\hat{\underline{x}}}=M\hat{\underline{x}}+I\underline{u}+K(\underline{y}-C\hat{\underline{x}}) \quad (13)$$

In equations 10-13, M is the host vehicle dynamic matrix, I is the host vehicle matrix for the input u, F is the input noise matrix, C is the output matrix, and y is the output vector. The input random noise disturbance and measurement noise are represented by vectors w and v respectively. A gain matrix is represented by K, which is selected to minimize the error of the estimates due to the process and measurement noise. The state variables of the system 10 are given by equation 12. The estimated path of the vehicle 12 and the closing velocity $V_{rel}$ of an object are given by equation 13, which may be referred to as an "observer". Equation 13 is designed to filter the yaw rate and steering angle measurements.

In step 114, the ASP module 18 determines whether an object is a moving or stationary object in response to the lateral velocity $v_{h\_lat}$, relative velocity $V_{rel}$, and a tolerance value $\beta_1$ using equation 14. When equation 14 is satisfied a collision with a stationary object may occur.

$$v_{h\_lat}=V_{rel}\pm\beta_1 \quad (14)$$

In step 116, the ASP module 18 determines whether the vehicle 12 and the detected object are on a collision course. When the vehicle 12 and the detected object are on a collision course, the ASP module 18 proceeds to step 118, otherwise the ASP module 18 returns to step 102.

Figure 4:
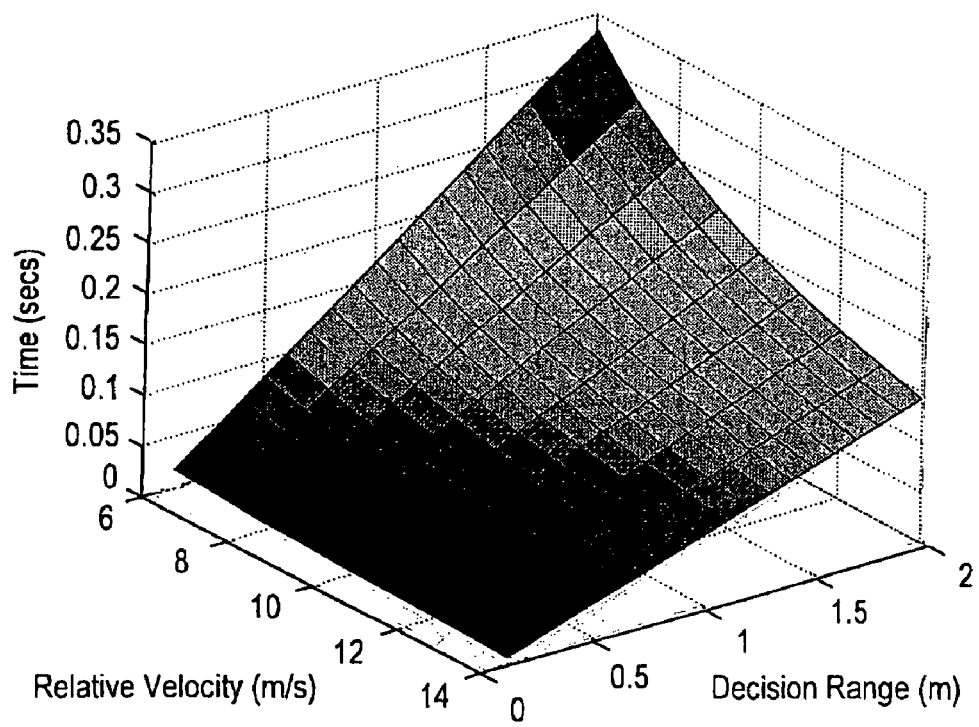
FIG. 4 is a decision-zone predictive time plot in accordance with an embodiment of the present invention.

In step 118, once the measured radial distance or range of the objects are confirmed, the latest detected objects that are of concern are compared and the closest detected object relative to the vehicle 12 is used to determine the time-to-collision (TTC). The time-to-collision TTC is determined in response to the estimated closing velocity $V_{rel}$. The approximate time available for estimating the time-to-collision TTC is provided in the plot of FIG. 4. The time available is plotted in relation to the range and the range rate of an object relative to the vehicle 12. Of course, this plot may be altered depending upon the direction of travel or heading of the object, the sophistication level of the object detection sensors 22, and the ability of corresponding hardware and software to monitor and track detected objects.

In step 120, the ASP module 18 determines an estimated speed dependent potential collision severity $\lambda_{sev}$ of the collision in response to the above-stated vehicle and object dynamics.

In step 122, the occupant sensors 26 generate occupant signals, as stated above, providing size, weight, and positioning information of the occupants. In one embodiment, the occupant sensors 26 are used to determine the distance between the occupants and the interior sides of the vehicle 12 or the distance between the occupants and the side airbags 44.

In step 124, the SRD module 20 determines the type of restraint to deploy and the activation or restraint deployment time RDT in response to the collision severity $\lambda_{sev}$ and the occupant signals. The SRD module 20 determines and verifies plausibility of range, change in range, range-rate, position, last predicted closest position, and heading of the object of concern relative to the vehicle 12.

In step 126, the SRD module 20 determines whether the magnitude of the time-to-collision TTC is less than the restraint deployment time RDT plus a sensor and microprocessor dependent time delay $\epsilon$. When this is the case the SRD module 20 proceeds to step 128, otherwise the SRD module 20 returns to step 102.

In step 128, the SRD module 20 determines whether a confirmation of an actual collision is desired. When a confirmation is not desired the SRD module 20 proceeds to step 130, otherwise the SRD module 20 proceeds to step 140.

In step 130 the SRD module 20 initializes the synchronization internal clock counter 21, to track the activation difference time $\alpha_{time}$ between the predicted contact time with the object and the activation time of a restraint, to assure precise time deployment of the restraint.

In step 132, the SRD module 20 determines whether the magnitude difference between the time-to-collision TTC and the restraint deployment time RDT is approximately equal to the activation difference time $\alpha_{time}$. The SRD module 20 monitors the activation difference time $\alpha_{time}$ using the internal clock counter 21 to assure that restraint activation is performed at the proper time. When the difference is equal to the activation difference time $\alpha_{time}$ the SRD module 20 proceeds to step 134, otherwise the SRD module 20 returns to step 130.

In step 134, the SRD module 20 may signal the front airbag module 48 the activation status of the side restraints 30. The front airbag module 48 may then determine whether frontal airbag deployment is appropriate.

In step 136, the controller 16 determines whether to deploy single state restraints, multi-stage restraints, or a combination thereof. Step 138 is performed for single stage deployment of restraints. A restraint, such as one of the side restraints 44 or 46 is deployed for a single-stage deployment. Steps 150 through 156 are performed when multi-stage deployment of restraints is performed.

In situations when collision confirmation is not desired equation 15 is used and provides a first restraint deployment status $RDS_1$ and represents tasks performed in steps corresponding to such situations. Seat integrated/door mounted airbags for torso protection and pillar/roof-supported airbags for head protection, as examples, may be activated based on the characteristics of a potential collision.

$$RDS_1 = \begin{cases} 1 & \text{if } (|TTC| \leq RDT + \varepsilon) \text{ and if } (|TTC - RDT| = \alpha_{time}) \\ 0 & \text{otherwise} \end{cases} \quad (15)$$

The following steps 140-156 describe deployment tasks that are performed after collision confirmation is detected and desired by an airbag collision contact sensor.

In step 140, the SRD module 20 adjusts a contact sensor threshold $\delta_{thres}$ to satisfy a second restraint deployment status $RDS_2$ of equation 16, where $K_s$ is the gain-scheduled parameter for adjusting the accelerometer threshold, $V_{cal}$ is the threshold velocity, $\delta_{cal}$ is the calibrated confirmation signal constant, and $\beta_2$ is the contact sensor output. Equation 16 represents tasks performed in steps 126, 140, 146, and 150.

$$RDS_2 = \begin{cases} 1 & \text{if } (|TTC| \le RDT + \varepsilon) \text{ and if } (|TTC - RDT| = \alpha_{time}) \\ & \text{and if } \beta_2 > \delta_{thres} \text{ where } \delta_{thres} = K_s \dfrac{V_{cal}}{V_{rel}} \delta_{cal} \\ 0 & \text{otherwise} \end{cases} \quad (16)$$

For localized side-collision events, such as a collision with a pole, the collision energy is concentrated at the onset of the collision and tends to "fold" the impacted location of a vehicle. In certain situations, conventional side restraint controllers may detect and classify a localized collision as a minor collision, which in turn may cause the controller to determine that deployment of a side restraint is not warranted. A side restraint may therefore not be deployed or deployment thereof may be delayed. When the lateral velocity $v_{h\_lat}$ is approximately equal to the closing-velocity $V_{rel}$, the SRD module 20 determines that the object of interest is a stationary object and adjusts the threshold $\delta_{thres}$ accordingly to account for a potential localized collision and provide improved and appropriate airbag deployment.

In step 142, the SRD module 20 determines side restraints to deploy and conditions those side restraints for deployment after confirmation of a collision. In step 144, the SRD module 20 initializes the synchronization internal clock counter 21 to track the activation difference time, to assure precise deployment time.

In step 146, as in step 132, the SRD module 20 determines whether the magnitude difference between the time-to-collision TTC and the restraint deployment time RDT is approximately equal to an activation difference time $\alpha_{time}$. The SRD module 20 monitors the activation difference time $\alpha_{time}$ to assure that restraint activation is performed at the proper time. When the difference is equal to the activation difference time $\alpha_{time}$ the SRD module 20 proceeds to step 148, otherwise the SRD module returns to step 144.

In step 148, the contact sensor 28 generates a collision confirmation signal in response to the detection of a collision or contact with an object. In step 150, the SRD module 20 determines whether the contact sensor output $\beta_2$ is greater than the threshold $\delta_{thres}$. When the contact sensor output $\beta_2$ is greater than the threshold $\delta_{thres}$ the SRD module 20 proceeds to step 152, otherwise the SRD module 20 does not deploy a side restraint and returns to step 102.

In step 152, the SRD module 20 may signal to the front airbag control module 48 and other supporting componentry the activation status of the side restraints 44 and 46. The SRD module 20 also monitors the internal counter 21.

In step 154, the controller 16 determines whether to deploy one or more of the side restraints 44 and 46 in a single stage mode, a multi-stage mode, or a combination thereof. When it is determined to deploy a side restraint in the single stage mode, step 156 is performed. When it is determined to deploy a side restraint in the multi-stage mode, steps 158-164 are performed.

In steps 158-164, the SRD module 20 activates selected side restraints in the multi-stage mode in response to a collision severity value and current occupant characteristics. In step 158, the collision severity value $\lambda_{sev}$ is determined according to equation 17, where $G_{rs}$ is a gain that is adjusted based on the confidence in or reliability of an object detection sensor to accurately detect an object. $G_1$ is the relative velocity regulatory gain, and $V_0$ is the threshold velocity.

$$\lambda_{sev} = G_{rs} G_1 \left( \dfrac{V_{rel}}{V_0} \right). \quad (17)$$

In step 160, the SRD module 20 determines a restraint determining value $Res_{det}$ using equation 18, where $G_{ws}$ is the weight sensor reliability gain, $G_2$ is the weight regulatory gain, $W_{occ}$ is the occupant weight, $W_0$ is the weight threshold, $G_{ps}$ is the occupant proximity sensor reliability gain, $p_{occ}$ is the occupant position relative to a side airbag, side panel, or interior side of the vehicle 12, and $p_0$ is the threshold position.

$$Res_{det} = G_{ws} G_2 \left( \dfrac{W_{occ}}{W_0} \right) \lambda_{sev} + G_{ps}(p_{occ} - p_0) \quad (18)$$

In step 162, the restraint determining value $Res_{det}$ is used to determine an inflation stage selection Res_stage using equation 19 where $L_3$-$L_0$ represent a series of progressively less severe deployment stages, including a potentially no deployment stage, and $\gamma_1$-$\gamma_3$ are the thresholds corresponding to each stage level of deployment.

$$\text{Res\_stage} = \begin{cases} L_3 & \text{if } (Res_{det} \ge \gamma_3) \\ L_2 & \text{if } (\gamma_2 \le Res_{det} < \gamma_3) \\ L_1 & \text{if } (\gamma_1 \le Res_{det} < \gamma_2) \\ L_0 & \text{if } (Res_{det} < \gamma_1) \end{cases} \quad (19)$$

In step 164, the SRD module 20 deploys one or more multi-stage side restraints in response to the inflation stage selection Res_stage.

The above-described steps are meant to be illustrative examples; the steps may be performed sequentially, synchronously, simultaneously, or in a different order depending upon the application.

The present invention provides a deployment control system for accurate and proper control of side restraint deployment. The control system deploys respective restraints in response to determined relative heading and dynamics of an impending collision object relative to a host vehicle. The control system determines an early deployment time, for activation of an adaptive restraint before or shortly after a collision occurs, to provide enhanced occupant protection. The control system minimizes inadvertent deployment of side-restraints and front airbags, minimizes late deployment of side restraints, and provides effective deployment decisions for localized collisions. Restraints are deployed in response to occupant characteristics in conjunction with predicted velocity dependent potential collision severity estimation. The algorithms utilized within the control system are tailored to dissipate the kinetic energy of occupants during a side collision event such that injuries can be avoided or effectively mitigated. Coordinated activation of multi-stage airbag deployment is also provided. The control system accounts for sensor availability and performance.

While the present invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

What is claimed is:

1. A side-impact adaptive restraints control system for a vehicle comprising:
   at least one adaptive restraint;
   at least one non-contact based side sensor configured to detect at least one object outside the vehicle, in at least one restraint dependent detection zone along a side of the vehicle, and generating object detection signals; and
   a controller determining a restraint dependent decision-making zone within said at least one restraint dependent detection zone, an activation time for and a deployment status of the adaptive restraint, and activating said at least one adaptive restraint before contact between said at least one object and said side.

2. A system as in claim 1 wherein said at least one adaptive restraint is an electronically augmented restraint selected from at least one of a side airbag, a side curtain, an internal restraint, an external restraint, an airbag, a pretensioner, a seatbelt controller, a head restraint controller, and a load limiting device.

3. A system as in claim 1 wherein said at least one object detection sensor is selected from at least one of a radar sensor, a lidar sensor, a vision sensor, an ultrasonic sensor, and an infrared sensor configured in response to adaptive restraint deployment characteristics.

4. A system as in claim 1 wherein said at least one restraint dependent detection zone and said restraint dependent decision-making zone comprise:
   a first detection zone approximately covering a first area between 2 o'clock and 4 o'clock relative to the vehicle, and a variable decision-making zone determined in response to adaptive restraint time constants and trajectory of the vehicle; and
   a second detection zone approximately covering a second area between 8 o'clock and 10 o'clock relative to the vehicle, and a variable decision-making zone determined in response to said adaptive restraint time constants and trajectory of the vehicle.

5. A system as in claim 1 wherein said controller in determining a deployment time determines and verifies plausibility of at least one of range, change in range, range-rate, position, last predicted closest position, and heading of said at least one object relative to the vehicle.

6. A system as in claim 1 wherein said controller in determining a deployment time determines an amount of time said at least one object is in said at least one restraint dependent detection zone and generates an in-zone time signal.

7. A system as in claim 6 wherein said controller in determining a deployment time tracks objects in said at least one decision zone and confirms that a number of sampled returns is greater than $$\frac{R_{max}}{V_{rel}T_{sens}},$$

where $V_{rel}$ is a relative velocity, $R_{max}$ is a maximum range threshold for decision-making, and $T_{sens}$ is a sampling time.

8. A system as in claim 1 wherein said controller determines a minimum relative velocity and filters objects that are parallel to the vehicle and determines a potential collision severity given by $$\lambda_{sev} = G_{rs}G_1\left(\frac{V_{rel}}{V_0}\right)$$

where $G_{rs}$ is an object detection sensor reliability gain, $G_1$ is a relative velocity regulatory gain, $V_{rel}$ is a relative velocity, and $V_0$ is a threshold velocity.

9. A system as in claim 1 further comprising a yaw rate sensor generating a yaw rate signal, said controller determining said activation time and said deployment status in response to said yaw rate signal.

10. A system as in claim 1 further comprising a steering angle sensor generating a heading signal, said controller determining said activation time and said deployment status in response to said heading signal.

11. A system as in claim 1 wherein said controller in determining said activation time determines a lateral velocity of the vehicle and compares said lateral velocity with a relative velocity and a tolerance value to determine potential collision with a stationary object.

12. A system as in claim 1 further comprising at least one occupant characteristic sensor generating occupant characteristic signals, said controller determining said activation time and said deployment status, and activating said at least one adaptive restraint in response to said occupant characteristic signals.

13. A system as in claim 1 wherein said controller in activating said at least one adaptive restraint compares a predicted contact time with said activation time in addition to a time-delay, and synchronizes a time difference between said predicted contact time and said activation time with an internal counter to assure precise deployment time.

14. A system as in claim 1 wherein said controller performs a side-collision confirmation and in response thereto prevents inadvertent activation of at least one front restraint.

15. A method of controlling activation of adaptive restraints within a vehicle comprising:
   detecting at least one object, in a restraint dependent detection and decision-making zone along a side of the vehicle, and generating object detection signals;
   generating a collision confirmation signal indicative of contact between said at least one object and the vehicle;
   determining an activation time for and a deployment status of said at least one adaptive restraint before contact between said at least one object and said side; and
   activating said at least one adaptive restraint in response to said collision confirmation signal.

16. A method as in claim 15 wherein activating said at least one adaptive restraint comprises:
   comparing a predicted contact time with said activation time in addition to a time-delay;
   determining a time difference between said predicted contact time and said activation time for sensor and microprocessor sampling rate synchronization; and
   comparing said collision confirmation signal with a threshold value.

17. A method as in claim 16 wherein said threshold value is equal to $$K_s\frac{V_{cal}}{V_{rel}}\delta_{cal}$$

where $K_s$, is a gain-scheduled parameter, $V_{cal}$ is a threshold velocity, $\delta_{cal}$ is a calibrated confirmation signal constant, and $V_{rel}$ is a relative velocity.

18. A method as in claim 16 wherein said threshold value is adjusted when said at least one object is determined to be a stationary object.

19. An adaptive restraint control system for a vehicle comprising:

at least one adaptive restraint;

at least one side sensor configured to detect at least one object, in at least one restraint dependent detection and decision-making zone along a side of the vehicle, and generating object detection signals; and a controller determining a deployment time for and a deployment status of said at least one adaptive restraint, and activating said at least one adaptive restraint before or after contact between said at least one object and said vehicle side, and in response to a multi-stage deployment algorithm.

20. A system as in claim 19 wherein said multi-stage deployment algorithm is an airbag multi-stage deployment algorithm with a restraint determining value given by $$Res_{det} = G_{ws}G_2\left(\frac{W_{occ}}{W_0}\right)\lambda_{sev} + G_{ps}(p_{occ} - p_0)$$

where $G_{ws}$ is a weight sensor reliability gain, $G_2$ is a weight regulatory gain, $W_{occ}$ is an occupant weight, $W_0$ is a weight threshold, $G_{ps}$ is an occupant proximity sensor reliability gain, $p_{occ}$ is an occupant position relative to interior side of the vehicle, and $p_0$ is a threshold position.

* * * * *